United States Patent [19]
Stewart et al.

[11] 4,281,970
[45] Aug. 4, 1981

[54] TURBO-EXPANDER CONTROL

[75] Inventors: William S. Stewart; Virgil R. Spurgeon, both of Bartlesville, Okla.

[73] Assignee: Phillips Petroleum Company, Bartlesville, Okla.

[21] Appl. No.: 48,930

[22] Filed: Jun. 15, 1979

[51] Int. Cl.³ .............................................. F04B 49/00
[52] U.S. Cl. ........................................ 417/53; 417/22; 417/26; 417/47
[58] Field of Search ......................... 417/22, 26, 47, 53

[56] References Cited

U.S. PATENT DOCUMENTS

| | | | |
|---|---|---|---|
| 3,150,814 | 9/1964 | Evans et al. | 417/47 X |
| 3,203,193 | 8/1965 | Ruhemann et al. | 62/13 |
| 3,360,944 | 1/1968 | Knapp et al. | 62/12 |
| 3,362,626 | 1/1968 | Schlirf | 417/47 X |
| 3,979,655 | 9/1976 | Rutshtein et al. | 318/609 |

*Primary Examiner*—Chris K. Moore

[57] ABSTRACT

In a process in which a turbo-expander is utilized to drive a compressor, the pressure of the gas flowing to the turbo-expander is maintained at a desired level by manipulating the speed of the turbo-expander. If the turbo-expander should tend to overspeed, the discharge output of the compressor is recycled to the suction inlet of the compressor to thereby increase the loading on the compressor which will result in a reduced turbine speed. More gas can then be fed through the turbo-expander which will maintain the desired pressure. If the pressure of the gas flowing to the turbo-expander should continue to increase, a bypass valve is utilized to bypass the turbo-expander to thereby maintain a desired pressure of the gas flowing to the turbo-expander.

7 Claims, 3 Drawing Figures

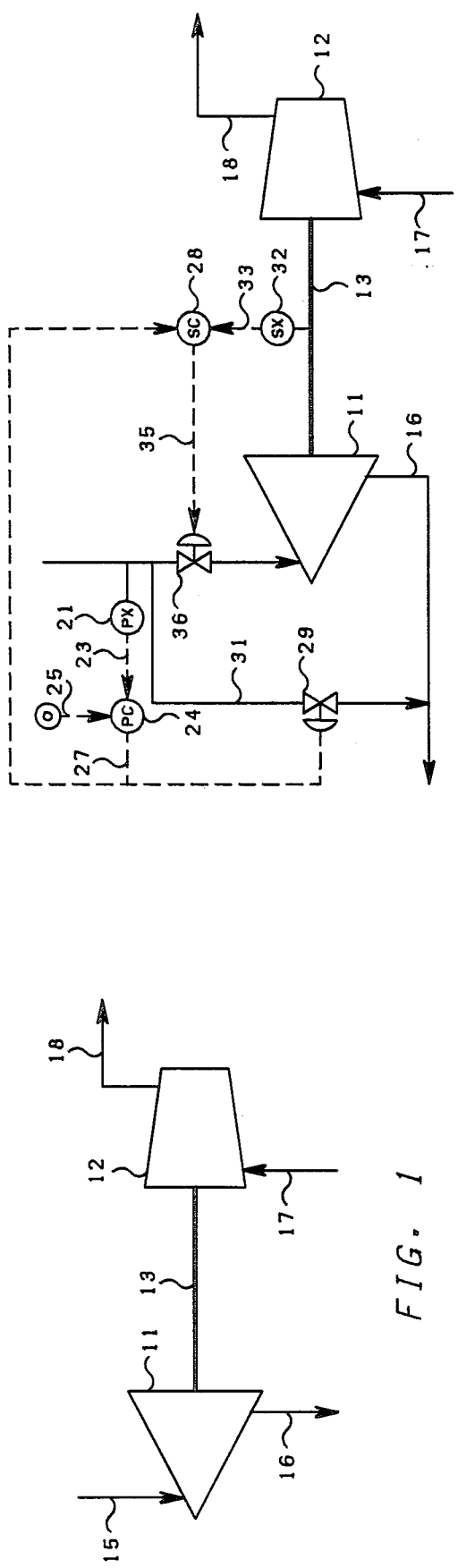
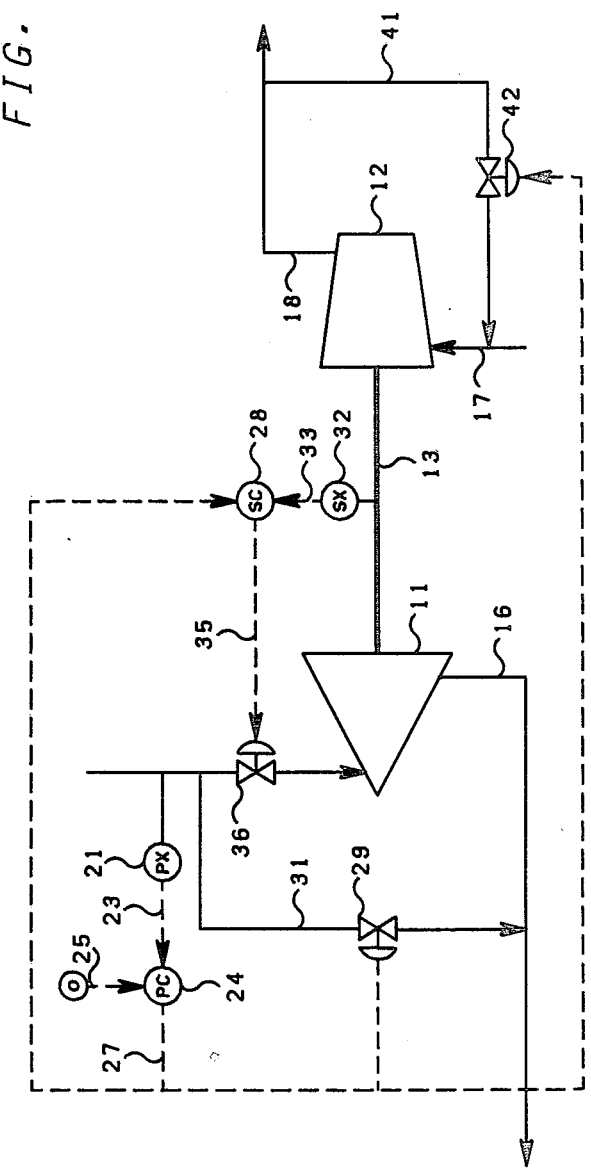
FIG. 1
FIG. 2
FIG. 3

TURBO-EXPANDER CONTROL

This invention relates to control of a turbo-expander. In one aspect, this invention relates to method and apparatus for substantially minimizing the temperature of the expanded fluid while maintaining a desired pressure of the fluid flowing to the turbo-expander.

The drawings in which:

FIG. 1 is a diagrammatic representation of a turbo-expander driving a compressor;

FIG. 2 is a prior art control system for the turbo-expander and compressor system illustrated in FIG. 1; and FIG. 3 is a diagrammatic representation of the improved control system of the present invention for the turbo-expander and compressor system illustrated in FIG. 1, will be utilized to describe the background of the present invention and also to describe the prior art over which the present invention is an improvement.

Referring now to FIG. 1, a turbo-expander 11 is illustrated operably connected to the compressor 12 by drive shaft 13. A fluid having a temperature T and a pressure P is supplied through conduit means 15 to the expander 11. The fluid is expanded to temperature $T_1$ and pressure $P_1$ where T is greater than $T_1$ and P is greater than $P_1$. The work removed is used to compress a second fluid which is provided to the compressor 12 through conduit means 17. The fluid flowing through conduit means 17 will have a temperature $T_2$ and a pressure $P_2$. The fluid flowing through conduit means 17 to the suction inlet of the compressor 12 is compressed to a pressure $P_3$ and a temperature $T_3$ and is provided from the discharge outlet of the compressor 12 through conduit means 18. $P_3$ will be greater than $P_2$ and $T_3$ greater than $T_2$. The turbo-expander and compression system illustrated in FIG. 1 finds application in many processes. In particular, the system illustrated in FIG. 1 is commonly associated with ethylene plant demethanizers.

The fluid flowing through conduit means 15 is often being provided from a process which must be operated at a certain pressure. The fluid flowing from the turbo-expander 11 through conduit means 16 is often used as a refrigerant or is provided to a liquid-vapor separation stage of the particular process with which the turbo-expander/compression system is associated. Ideally, the pressure of the fluid flowing to conduit means 15 is maintained at a desired level and the temperature of the fluid flowing through conduit means 16 is substantially minimized.

The prior art method for controlling the turbo-expander/compression system illustrated in FIG. 1 is illustrated in FIG. 2. Pressure transducer 21 is utilized to provide a signal 23 which is representative of the pressure of the fluid flowing through conduit means 15. Signal 23 is provided as an input to the pressure controller 24 from the pressure transducer 21. The pressure controller 24 is also provided with a set point signal 25 which is representative of the desired pressure of the fluid flowing through conduit means 15. Responsive to signals 23 and 25, the pressure controller 24 provides an output signal 27 which is responsive to the difference between signals 23 and 25. Signal 27 is provided as a set point signal to the speed controller 28 and is also provided as a control signal to the pneumatic control valve 29 which is operably located in conduit means 31. Conduit means 31 provides a means for bypassing the fluid flowing through conduit means 15 around the expander 11.

The speed transducer 32 provides an output signal 33 which is representative of the speed at which the shaft 13 is rotating. Responsive to signals 27 and 33, the speed controller 28 provides an output signal 35 which is responsive to the difference between signals 27 and 33. Signal 35 is provided as a control signal to the pneumatic control valve 36 which is operably located in conduit means 15.

Split-range control is utilized in the prior art control system illustrated in FIG. 2. Signal 27 will typically have a range of from 3 to 9 pounds if a pneumatic control system is being utilized. Three pounds may well correspond to the lower operating limit of the turbo-expander 11 while 9 pounds will correspond to the highest allowable speed of the turbo-expander 11. Thus, if signal 27 is equal to 9 pounds the turbo-expander 11 will be operating at its maximum speed. However, this does not necessarily imply that the control valve 36 will be fully open. The extent to which the control valve 36 is open will depend upon the loading on the compressor 12. It is thus possible, and indeed highly likely, that the pressure of the fluid flowing through conduit means 15 may continue to rise even after the turbo-expander 11 is operating at its maximum speed if the loading on the compressor 12 is light. If this occurs, the prior art control system, illustrated in FIG. 2, provides a means for bypassing the turbo-expander 11 by opening the control valve 29 which is operably located in conduit means 31. This is accomplished when the output signal 27 of the pressure controller 24 typically exceeds 9 pounds. The pneumatic control valve 29 will typically be fully closed at 9 pounds and will be fully open when signal 27 is equal to 15 pounds.

The prior art control system, illustrated in FIG. 2, provides a means for controlling the turbo-expander/compression system. However, the expansion of a fluid across a valve is a Joule-Thompson expansion, while the expansion of a fluid across the expander 11 is an isotropic expansion. An isotropic expansion results in a lower temperature than a Joule-Thompson expansion. Thus, if fluid must be bypassed through conduit means 31 and the control valve 29, the temperature of the fluid flowing through conduit means 16 will be higher than if all of the fluid is provided through the expander 16. It is thus an object of this invention to substantially minimize the temperature of the expanded fluid and maintain the desired pressure for the fluid flowing to the turbo-expander by providing method and apparatus to insure that substantially all of the gas flowing through conduit means 15 is sent through the expander 11 and is not bypassed through a bypass conduit such as conduit means 31 illustrated in FIG. 2.

In accordance with the present invention, method and apparatus is provided whereby the discharge output from the compressor may be recycled to the suction inlet of the compressor through a control valve. Again, split-range control is utilized. However, instead of bypassing fluid around the turbo-expander, the second range of the split-range control operates to open the pneumatic control valve which controls the recycling of fluid from the discharge outlet to the suction inlet of the compressor. If the turbo-expander should be operating at its full speed and the pressure at the inlet to the turbo-expander should continue to rise above the set point, then the control system operates to open the pneumatic control valve controlling the recycling of fluid from the discharge outlet to the suction inlet of the compressor in such a manner that the loading on the compressor is increased. When the loading on the compressor is increased, the speed of the expander will decrease and the flow of fluid to the expander can be increased. As the flow of fluid is increased, the speed of the turbo-expander will again approach a maximum speed but the pressure at the inlet to the expander will be decreased to the set point value. In this manner, all of the fluid to the expander is provided through the turbo-expander and is not bypassed around the turbo-expander which results in the desired operating pressure at the inlet to the turbo-expander and also results in a substantially minimum temperature for the fluid flowing from the outlet of the turbo-expander. Bypassing of the turbo-expander is utilized only as a last resort to control the pressure at the inlet to the expander.

Other objects and advantages of the invention will be apparent from the foregoing brief description of the invention and from the claims as well as from the detailed description of FIG. 3 which follows.

Referring now to FIG. 3, the difference between the prior art illustrated in FIG. 2 and the invention illustrated in FIG. 3 resides in the conduit means 41 in which pneumatic control valve 42 is operably located. Fluid flowing from the discharge outlet of the compressor 12 is recycled through conduit means 41 to the suction inlet of the compressor 12. The control signal 27 from the pressure controller 24 is provided as a control signal to the pneumatic control valve 42.

In operation, the pressure controller 24 preferably provides an output signal 27 which can range from 3 to 15 pounds. Three pounds will typically be representative of the lower operating speed for the turbo-expander 11 with 6 pounds being representative of the highest operating speed for the turbo-expander 11. If signal 27 remains between 3 and 6 pounds, the desired pressure flowing to the inlet of the expander 11 can be maintained simply by manipulating the control valve 36. However, if signal 27 should exceed 6 pounds, the turbo-expander 11 will be operating at its top speed and the pressure flowing to the inlet of the expander 11 can no longer be controlled simply by manipulating the pneumatic control valve 36. Even though the turbo-expander 11 is operating at its top speed, the pneumatic control valve 36 may not be fully open depending upon the loading of the compressor 12 as has been previously stated.

If signal 27 should exceed 6 pounds, the pneumatic control valve 42 begins to open. Preferably, the pneumatic control valve 42 is fully closed at 6 pounds and is fully open at 12 pounds. As the pneumatic control valve 42 begins to open, fluid is recycled from the discharge outlet of the compressor 12 to the suction inlet of the compressor 12. This results in an increased loading on the compressor 12 which will have the effect of reducing the speed at which the turbo-expander 11 is operating. The pneumatic control valve 36 can then be more fully opened to again increase the speed of the expander under the new loading conditions. More fully opening the pneumatic control valve 36 results in a decrease in the pressure at the inlet to the expander 11 and the pressure at the inlet to the expander 11 will again return to its set point value.

Only if signal 27 should become greater than 12 pounds is the bypass conduit means 31 utilized. Pneumatic control valve 29 is fully closed at 12 pounds and fully open at 15 pounds. If signal 27 should exceed 12 pounds, pneumatic control valve 29 begins to open to relieve the pressure at the inlet to the expander 11.

The control system illustrated in FIG. 3 provides a method and apparatus for allowing substantially all of the fluid flowing to a turbo-expander to flow through the expander rather than through a bypass around the turbo-expander while still maintaining a desired operating pressure at the inlet to the turbo-expander. This control substantially minimizes the temperature of the effluent flowing from the turbo-expander which is highly desirable where the effluent flowing from the turbo-expander is being utilized in a refrigeration operation or where vapor-liquid separation is being used to separate components in the effluent flowing from the expander 11.

For the sake of simplicity, the invention has been illustrated and described in terms of a single turbo-expander driving a single compressor. However, the invention is also applicable to multiple turbo-expander/compressor systems. For example, one turbo-expander may drive a plurality of compressors.

A specific control configuration is set forth in FIG. 3 for the sake of illustration. However, the invention extends to different types of control system configurations which accomplish the purpose of the invention. Lines designated as signal lines in the drawings are pneumatic in this preferred embodiment. However, the invention is also applicable to electrical, mechanical, hydraulic or other signal means for transmitting information. In almost all control systems some combination of these types of signals will be used. However, use of any other type of signal transmission, compatible with the process and equipment in use, is within the scope of the invention.

The controllers shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is with the scope of the invention. The operation of proportional-integral controllers is well known in the art. The output control signal of a proportional-integral controller may be represented as $$S = K_1 E + K_2 \int E dt$$

where $S$ = output control signals;
$E$ = difference between two input signals; and
$K_1$ and $K_2$ = constants.

The scaling of an output signal by a controller is well known in control systems art. Essentially, the output of a controller may be scaled to represent any desired factor or variable. An example of this is where a desired pressure and an actual pressure is compared by a controller. The output could be a signal representative of a desired change in the flow rate of some gas necessary to make the desired and actual pressures equal. On the other hand, the same output signal could be scaled to represent a percentage or could be scaled to represent a temperature change required to make the desired and actual pressures equal. If the controller output can range from 6 pounds to 15 pounds, which is typical, then the output signal could be scaled so that an output signal having a pressure of 9 pounds corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other types of equipment or combinations of one or more such equipment types. While the presently preferred embodiment of the invention preferably utilizes a combination of pneumatic control elements, the apparatus and method of the invention can be implemented using a variety of specific equipment available to and understood by those skilled in the process control art. Likewise, the format of the various signals can be modified substantially in order to accommodate signal format requirements of a particular installation, safety factors, the physical characteristics of the measuring or control instruments and other similar factors. In addition, all signals could be translated into a "suppressed zero" or other similar format in order to provide a "live zero" and prevent an equipment failure from being erroneously interpreted as a low (or high) measurement or control signal. Regardless of the signal format or the exact relationship of the signal to the parameter which it represents, each signal representative of a measured process parameter or representative of a desired process value will bear a relationship to the measure parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

The invention has been described in terms of a preferred embodiment as illustrated in FIG. 3. Specific components used in the practice of the invention as illustrated in FIG. 3 such as pressure transducer 21, speed transducer 32, pressure controller 34, speed controller 28, and pneumatic control valves 29, 36 and 42 are each well known commercially available control components such as are described at length in *Perry's Chemical Engineers' Handbook,* 4th Edition, Chapter 22, McGraw-Hill.

While the invention has been described in terms of the presently preferred embodiment, reasonable variations and modifications are possible by those skilled in the art within the scope of the described invention and the appended claims. Variations, such as using different pressure ranges for the split-range control are within the scope of the present invention.

That which is claimed is:

1. Apparatus comprising:
    a turbo-expander means having a suction inlet and a discharge outlet;
    a compressor means having a suction inlet and a discharge outlet;
    a drive shaft means operably connecting said turbo-expander means and said compressor means;
    first conduit means for supplying a fluid to the suction inlet of said turbo-expander means;
    second conduit means for withdrawing a fluid from the discharge outlet of said turbo-expander means;
    third conduit means for supplying a fluid to the suction inlet of said compressor means;
    fourth conduit means for withdrawing a fluid from the discharge outlet of said compressor means;
    fifth conduit means for recycling fluid from said fourth conduit means to said third conduit means;
    a first control valve means operably located in said first conduit means;
    a second control valve means operably located in said fifth conduit means;
    means for establishing a first signal which is a function of the pressure at the suction inlet of said turbo-expander means, said first signal having a first range and a second range, where at least a part of the first range of said first signal is outside the second range of said first signal and at least a part of the second range of said first signal is outside the first range of said first signal;
    means for manipulating said first control valve means in response to the first range of said first signal; and
    means for manipulating said second control valve means in response to the second range of said first signal, the first range and the second range of said first signal being selected in such a manner that said second control valve means is generally fully closed when said first signal is in the first range, the transition point between the first range of said first signal and the second range of said first signal being selected to generally represent the substantially maximum operating speed of said turbo-expander means.

2. Apparatus in accordance with claim 1 wherein said means for establishing said first signal comprises:
    means for establishing a second signal representative of the pressure at the suction inlet of said turbo-expander means;
    means for establishing a third signal representative of the desired pressure at the suction inlet of said turbo-expander means; and
    means for comparing said second signal and said third signal and for establishing said first signal responsive to the difference between said second signal and said third signal.

3. Apparatus in accordance with claim 2 wherein said means for manipulating said first control valve means in response to the first range of said first signal comprises:
    means for establishing a fourth signal representative of the speed at which said turbo-expander means is operating;
    means for comparing said first signal and said fourth signal and for establishing a fifth signal responsive to the difference between said first signal and said fourth signal; and
    means for manipulating said first control valve means in response to said fifth signal.

4. A method for controlling a system in which a turbo-expander is utilized to drive a compressor comprising the steps of:
    supplying a fluid through a first control valve to the suction inlet of said turbo-expander;
    withdrawing a fluid from the discharge outlet of said turbo-expander;
    supplying a fluid to the suction inlet of said compressor;
    withdrawing a fluid from the discharge outlet of said compressor;
    establishing a first signal which is a function of the pressure at the suction inlet of said turbo-expander, said first signal having a first range and a second range where at least a part of the first range of said first signal is outside the second range of said first signal and at least a part of the second range of said first signal is outside the first range of said first signal;

manipulating said first control valve in response to the first range of said first signal to thereby manipulate the flow of fluid to the suction inlet of said turbo-expander; and recycling fluid from the discharge outlet of said compressor to the suction inlet of said compressor through a second control valve, which is manipulated in response to the second range of said first signal, said second control valve being substantially fully closed when said first signal is in the first range, the transition point between said first range and said second range of said first signal being selected so as to be substantially representative of the substantially maximum operating speed of said turbo-expander.

5. A method in accordance with claim 4 wherein said step of establishing said first signal comprises:

establishing a second signal representative of the pressure at the suction inlet of said turbo-expander;

establishing a third signal representative of the desired pressure at the suction inlet of said turbo-expander; and comparing said second signal and said third signal and establishing said first signal responsive to the difference between said second signal and said third signal.

6. A method in accordance with claim 5 wherein said step of manipulating said first control valve in response to the first range of said first signal comprises:

establishing a fourth signal representative of the speed at which said turbo-expander is operating;

comparing said first signal and said fourth signal and establishing a fifth signal responsive to the difference between said first signal and said fourth signal; and manipulating said first control valve in response to said fifth signal.

7. A method for controlling a system, in which a turbo-expander is utilized to drive a compressor and in which said turbo-expander is operating at a substantially maximum speed and the pressure at the suction inlet of said turbo-expander is above the desired operating pressure, said method comprising the step of recycling fluid from the discharge outlet of said compressor to the suction inlet of said compressor so as to maintain a desired operating pressure at the suction inlet of said turbo-expander and substantially minimize the temperature of the fluid flowing from the outlet of said turbo-expander.

* * * * *